United States Patent [19]

Yamazaki

[11] Patent Number: 4,672,597
[45] Date of Patent: Jun. 9, 1987

[54] CLOCK SIGNAL REPRODUCING CIRCUIT FOR A PLAYER REPRODUCING INFORMATION OF A DISC

[75] Inventor: Shohei Yamazaki, Hamamatsu, Japan

[73] Assignee: Nippon Gakki Seizo Kabushiki Kaisha, Hamamatsu, Japan

[21] Appl. No.: 543,982

[22] Filed: Oct. 20, 1983

[30] Foreign Application Priority Data

Oct. 26, 1982 [JP]  Japan .................................. 57-187792

[51] Int. Cl.$^4$ ............................. G11B 5/02; G11B 5/09
[52] U.S. Cl. .......................................... 369/59; 369/50; 360/51
[58] Field of Search ....................... 360/41, 51; 369/59, 369/124; 307/269, 511, 512, 514, 527; 328/155, 133; 375/120, 82; 329/122

[56]   References Cited
U.S. PATENT DOCUMENTS

| 4,222,009 | 10/1980 | Moulton et al. | 375/120 X |
| 4,371,974 | 2/1983 | Dugan | 375/120 X |
| 4,371,975 | 2/1983 | Dugan | 350/51 X |
| 4,380,815 | 4/1983 | Clendening | 375/120 X |
| 4,400,667 | 8/1983 | Belkin | 375/120 X |
| 4,422,176 | 12/1983 | Summers | 375/120 |
| 4,520,319 | 5/1985 | Baker | 375/120 X |
| 4,535,459 | 8/1985 | Hogge, Jr. | 375/120 X |

Primary Examiner—Aristotelis M. Psitos
Attorney, Agent, or Firm—Spensley Horn Jubas & Lubitz

[57]   ABSTRACT

A clock signal reproducing circuit for a player reproducing information of a disc reproduces a clock signal from a signal reproduced from a disc via a pickup head. The clock signal reproducing circuit comprises clock signal generating circuit for generating a clock signal having a period of about 1/n (n being an integer) of the signal reproduced from the disc, a first detecting circuit which, in response to the signal reproduced from the disc via the pickup head and the clock signal delivered from the clock signal generating circuit, detects a phase error between the two signals containing a component for ½ period of the clock signal, a second detecting circuit which, in response to the clock signal delivered from the clock signal generating circuit, detects the component for ½ period of the clock signal at a timing when the first detecting circuit detects the phase error, and a combinating circuit which cancels the component for ½ period of the clock signal by combining output signals of the first and second detecting circuits thereby to provide only the phase error component. A phase locked loop is operated in response to this phase error component such that the clock signal and the input signal reproduced from the disc are in phase with each other.

7 Claims, 23 Drawing Figures

CLOCK SIGNAL REPRODUCING CIRCUIT FOR A PLAYER REPRODUCING INFORMATION OF A DISC

BACKGROUND OF THE INVENTION (a) Field of the Invention

This invention relates to a clock signal reproducing circuit for a player reproducing information of a disc such as a digital audio disc or a video disc capable of reproducing, from a signal reproduced from the disc via a pickup head, a clock signal which was used for setting a timewise reference in recording information pits on the disc and, more particularly, to a clock signal reproducing circuit capable of accurately performing phase error detection in controlling a phase relation between the reproduced clock signal and the signal reproduced from the disc and also performing the control of the phase relation accurately and easily thereby to reproduce an accurate clock signal.

(b) Description of the Prior Art

In a player for reproducing information of a disc, a clock signal which is reproduced from a signal reproduced from the disc via pickup head and representing an information pit on the disc (hereinafter referred to as "reproduced signal") is utilized for rotation control in a CLV (constant linear velocity) system or signal demodulation.

FIG. 1 shows a general structure of an overall control system for an optical type digital audio disc reproducing player. In this figure, a disc 1 is placed on a turntable 2 and driven by a spin motor 3. An optical type pickup head 4 contains a semiconductor laser, an optical system, a light-receiving element, a focus control coil 5 and a tracking control coil 6. The pickup head 4 projects a laser beam from an objective lens 7 onto the recording surface of the disc 1 and receives the reflected beam through the objective lens 7. The pickup head 4 is fed in the radial direction of the disc 1 by means of a feed motor 8.

A signal which has been detected by the pickup head 4 is supplied to a demodulation circuit 12 through a pre-amplifier 9, an AGC (automatic gain control) circuit 10 and a waveform shaping circuit 11.

A focus servo circuit 13 detects out-of-focusing of the laser beam in response to a light receiving signal and actuates the focus control coil 5 so that the laser beam is accurately focused on the recording surface of the disc.

A tracking error detecting circuit 15 detects, responsive to an information pit reproduction signal, deviation of the laser beam from the pit train and a tracking servo circuit 14 thereupon actuates the tracking control coil 6 to correct the error. In a case where the deviation in the tracking has enlarged with the progress of reproduction of the disc to such a degree that the tracking control coil 6 can no longer correct the deviation, a tracking deviation detecting circuit 24 delivers out a feed request signal so that the feed motor 8 is driven by a feed motor driving circuit 40 through a system control circuit 37.

The output signal of the waveform shaping circuit 11 is not only supplied to the demodulation circuit 12 but also utilized for preparation of a detection signal in the CLV (constant linear velocity) disc rotation servo. More specifically, the output signal of the waveform shaping circuit 11 is applied to a clock signal reproducing circuit 16 where a clock signal is reproduced. A synchronizing signal detecting circuit 17 detects and delivers out a synchronizing signal contained in the output signal of the waveform shaping circuit 11. The synchronizing signal delivered from the synchronizing signal detecting circuit 17 is divided in frequency by a frequency divider circuit 18 and thereafter is applied to a phase comparator circuit 19. The phase comparator circuit 19 compares the frequency divided signal with a signal obtained by frequency-dividing by a frequency divider circuit 21 a master clock pulse generated from a master clock oscillator circuit 20 and controls the spin motor 3 through a disc rotation servo circuit 22 so that these signals are brought in phase with each other.

The demodulation circuit 12 demodulates the signal which was recorded on the disc 1 after being modulated by EFM (eight to fourteen modulation) to the original 8-bit signal and also removes signals such as coupling bits and a synchronizing signal which have now become unnecessary. A data control circuit 26, an error correction circuit 27 and a memory circuit 28 serve to deinterleave an output signal of the demodulation circuit 12 which was recorded on the disc 1 after being interleaved to the original signal, check whether there is an error involved in the signal, effect error correction in the error correction circuit 27 if there is an error and effect error interpolation if the error is too large to be corrected. Further, data alignment and absorption of wow and flutter are performed by storing the signal after the error correction or interpolation in the memory circuit 28 at a timing of the reproduced clock signal and thereafter reading out this signal at a timing of the master clock pulse.

A signal provided by the memory circuit 28 which is a time division multiplexed signal of a right channel signal and a left channel signal is applied to D/A converters 29 and 30 so as to be separated to the right and left channels at a timing of the master clock pulse and converted to the original analog signals, i.e., audio signal.

A subcode detecting circuit 36 detects subcodes which are codes representing an address, the number of music, time required for performing the piece of music etc. from the signal which has been demodulated by the demodulation circuit 12 and supplies the detected subcodes to the system control circuit 37. The system control circuit 37 receives address, the number of music etc. designated by an operation key 38 through a decoder 39, compares them with the detected subcodes and drives the feed motor 8 through the feed motor driving circuit 40 so that they coincide with each other. The detected subcodes are indicated by a display unit 42 through a driving circuit 41.

In the control system described above, the prior art clock reproducing circuit 16 has been constructed as shown in FIG. 2. In FIG. 2, a clock detecting circuit 50 detects a clock signal from an output signal of the waveform shaping circuit 11. Since this clock signal is slightly irregular in its period, it is first converted by a frequency-voltage converter 51 into a voltage corresponding to its frequency and a voltage-controlled type oscillator (VCO) 52 is driven by this voltage to provide a clock signal of a regular period (about 1/n of the reproduced signal where n is an integer). However, if such irregularity of the clock signal from the waveform shaping circuit 11 is permissively slight, such clock detecting circuit 50 may be omitted and the output of the waveform shaping circuit 11 may be used as an input of the frequency-voltage converter 51. It should be noted here that as the VCO 52, a VCO which can oscillate for itself with a free-running frequency corresponding to such period may be used without preparing the detecting circuit 50 and the converter 51. A phase error detecting circuit 53 compares in phase the output of the waveform shaping circuit 11, i.e., the reproduced signal, with the output of the VCO 52 and controls the VCO 52 in such a manner that these outputs are brought in phase with each other. The VCO 52 thereby generates a reproduced clock signal synchronized with the reproduced signal.

FIG. 3 shows an example of a specific construction of the prior art phase error detecting circuit 53. In this circuit, the output of the waveform shaping circuit 11 is delayed by the output of the VCO 52. The output of the waveform shaping circuit 11 and a Q output of a D-flip-flop circuit 54 are applied to an exclusive OR gate 55. The output of the exclusive OR gate 55 is smoothed by a time constant circuit consisting of a resistor R1 and a capacitor C1 and the VCO 52 is controlled by the smoothed output of this time constant circuit.

FIGS. 4(a) through 4(e) are waveform diagrams respectively showing waveforms appearing in portions designated by reference characters (a) through (e) in the circuit of FIG. 3. If it is assumed that a state designated by P5 is one in which the signal of (a) and that of (b) are synchronized with each other, the control for synchronization may be performed in such a manner that the signal of (e) will become zero. According to this method, however, the phase error between the signals of (a) and (b) is corrected by a control in which the phase of the signal of (e) is shifted always in the direction of advancing the phase and never in the direction of delaying the phase. Consequently, though the phase error is decreased from P1 through P2, P3 and P4 to the state P5 in which the signals of (a) and (b) are synchronized, a slight excessive advancement in the phase causes a delay in the signal of (b) by one period as illustrated as a state P6 and the signal of (e) becomes large again. This necessitates the control to advance the phase of the signal of (b) from the initial state again and, accordingly, it is difficult to reach a stable state in which the signals of (a) and (b) are synchronized with each other.

If it is assumed that a state designated by P2 is one in which the signals of (a) and (b) are synchronized with each other, a control may be effected in such a manner that the voltage of the signal of (e) at the state P2 is made a reference voltage and the phase of the signal in (b) is advanced if the voltage of the signal of (e) is larger than this reference voltage whereas the phase is delayed if the voltage of the signal of (e) is smaller than the reference voltage. Since, however, the voltage of the signal of (e) is one derived by smoothing the signal of (d), the voltage of the signal of (e) varies depending upon frequency of generation of the signal of (d), i.e., frequency of inversion of the reproduced signal so that the coincidence of the voltage of the signal of (e) with the above described reference voltage does not necessarily represent a state in which the signals of (a) and (b) are synchronized with each other.

SUMMARY OF THE INVENTION

An object of the present invention is to provide a clock signal reproducing circuit for a player reproducing information of a disc capable of accurately performing phase error detection in controlling a phase relation between a reproduced signal and a clock signal.

Another object of the invention is to provide a clock signal reproducing circuit capable of synchronizing the phases of the reproduced signal and the clock signal by a two-way control in both directions of advancing and delaying the phase of the clock signal.

Still another object of the invention is to provide a clock signal reproducing circuit capable of eliminating variation in the phase error signal in the synchronized state depending upon frequency of inversion of the reproduced signal.

According to the present invention, an error signal containing a ½ clock period signal is prepared from a reproduced signal and a clock signal in a similar manner to the circuit shown in FIG. 3 and also a ½ clock period signal is separately prepared. By combining these signals and thereby cancelling the ½ clock period signal, the error signal only can be obtained. According to the invention, signals of different polarities depending upon the advance or delay of the phase can be derived as the error signals whereby the reproduced signal and the clock signal can be easily synchronized with each other by a two-way control, i.e. both in the direction in which the phase is advanced and in the direction in which the phase is delayed. Since the state in which the error signal is zero is made the synchronized state, the instability of the error signal in the synchronized state depending upon the frequency of inversion of the reproduced signal can be eliminated. For these reasons, a stable clock signal can be reproduced.

BRIEF DESCRIPTION OF THE DRAWINGS

In the accompanying drawings.

DESCRIPTION OF A PREFERRED EMBODIMENT

Figure 4:
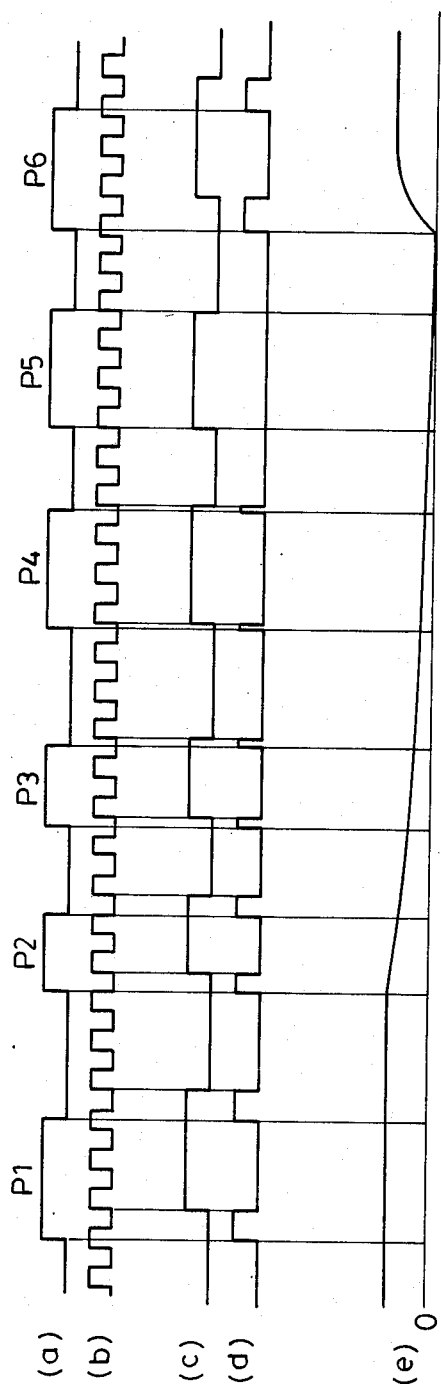
FIGS. 4(a) through 4(e) are waveform diagrams showing waveforms appearing in portions designated by (a) through (e) in FIG. 3.
Figure 5:
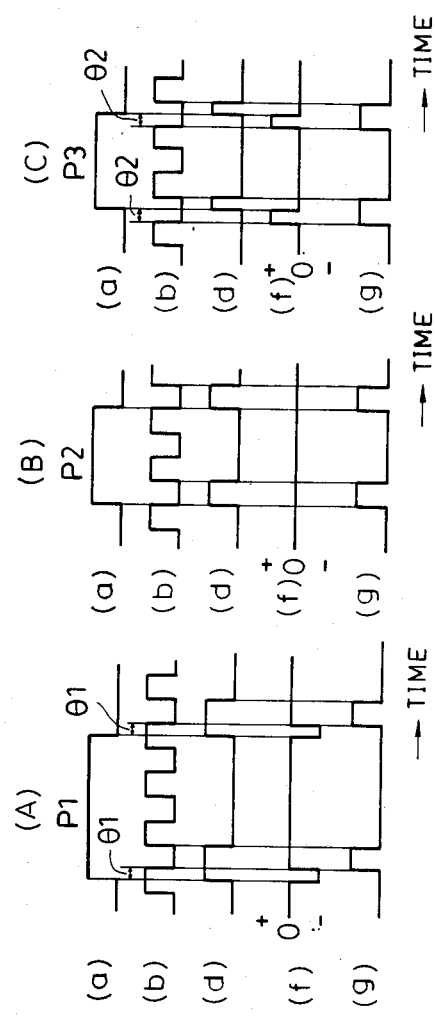
FIGS. 5(A) through 5(C) are waveform diagrams for explaining the basic principle of the invention.

In the present invention, the state P2 is determined to be a state in which the signals of (a) and (b) are synchronized with each other, if the states shown in FIGS. 4(a) through 4(e) are taken for example. In this case, P1 represents a state in which the phase of a clock signal of (b) is delayed and P3 a state in which the phase of the signal of (b) is advanced. FIGS. 5A through 5C show the states of P1, P2 and P3 in FIG. 4 selectively. In FIGS. 5A through 5C, (a), (b) and (d) are the same waveforms as those of FIGS. 4(a), 4(b) and 4(d). The phase error of the reproduced clock signal of (b) with respect to the waveform-shaped output of (a) is shown in (f) of FIGS. 5(A) through 5 (C) in which the direction of the phase error is indicated by polarity (the positive sign (+) representing advance and the negative sign (−) representing delay) and the amount of the phase error by the pulse width. In the case of FIG. 5(A) in which the phase is delayed by $\theta1$, the phase error is indicated by the negative polarity (−) and the pulse width $\theta1$. In the case of FIG. 5(B) in which the signals of (a) and (b) are synchronized with each other, the phase error is zero. In the case of FIG. 5(C) in which the phase is advanced by $\theta2$, the phase error is indicated by the positive polarity (+) and the pulse width $\theta2$.

Figure 1:
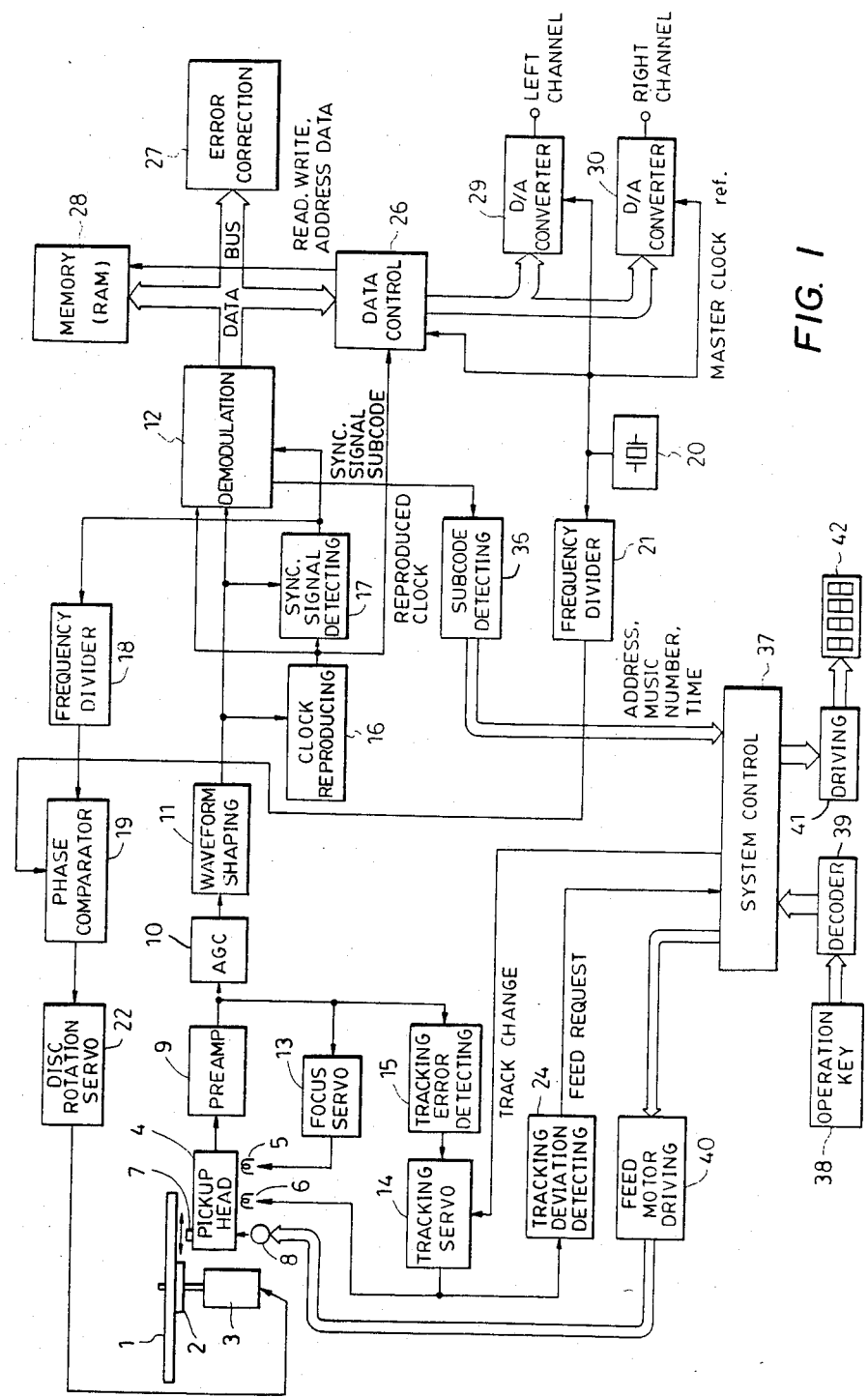
FIG. 1 is a block diagram showing an overall control system for a digital audio disc reproducing player.
Figure 2:
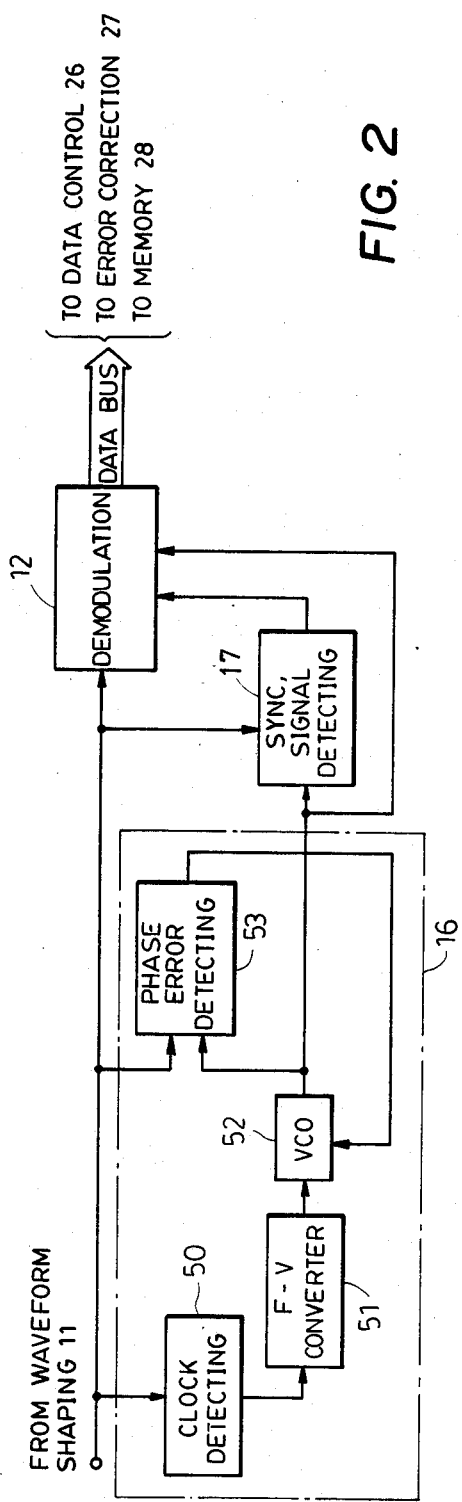
FIG. 2 is a block diagram showing an example of a clock signal reproducing circuit 16 of FIG. 1.
Figure 3:
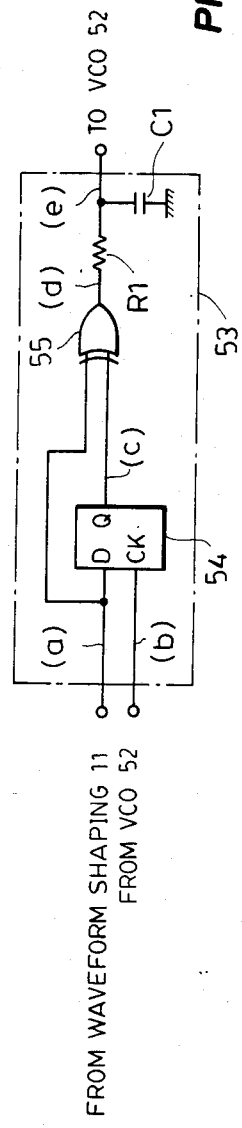
FIG. 3 is a circuit diagram showing an example of a prior art phase error detecting circuit 53 of FIG. 2.

Addition of the signal of (f) to the signal of (d) in FIG. 5 results in generation of a signal of (g). This signal of (g) is a signal having a pulse width equivalent to one half of the period of the clock signal regardless of the advance or delay of the phase (hereinafter referred to as a "½ clock period signal"). If, accordingly, the state P2 in FIG. 4 is determined to be a state in which the signals of (a) and (b) are synchronized, the signal of (d) in FIG. 4 (the output of the exclusive OR gate 55 in the circuit of FIG. 3) is a signal containing the ½ clock period signal besides the phase error. Therefore, by removing the ½ clock period signal component from the signal of FIG. 4(d), a signal containing only phase error information can be obtained.

Figure 6:
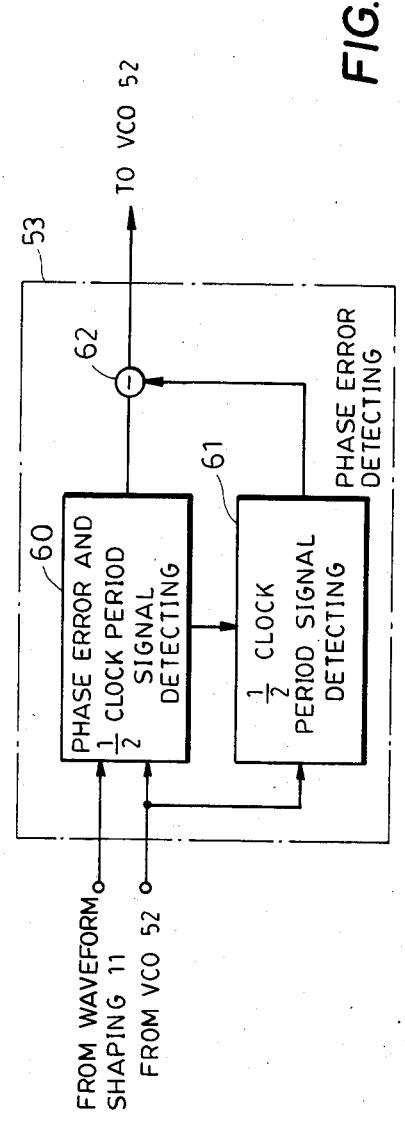
FIG. 6 is a block diagram showing an embodiment of the invention.

FIG. 6 shows an embodiment of the invention applied to the phase error detecting circuit 53 in the clock signal reproducing circuit 16. Referring to FIG. 6, a phase error and ½ clock period signal detecting circuit 60 receives the output signal of the waveform shaping circuit 11 (reproduced signal) and the clock signal generated by the VCO 52 and provides a signal representing a phase error between the two signals as a first detection signal. This signal contains a ½ period component of the clock signal generated by the VCO 52. A ½ clock period signal detecting circuit 61 receives the clock signal generated by the VCO 52 and provides a pulse signal having a width of ½ period of the clock signal as a second detection signal at a timing when the phase error and ½ clock period signal detecting circuit 60 outputs the pulse signal. The first and second detection signals are smoothed in the respective circuits. The first and second detection circuits are then applied to a combining circuit 62 consisting of a subtractor. In the combining circuit 62, the ½ period component of the clock signal is cancelled and the phase error component in the first detection signal only is delivered from the combining circuit 62. By controlling the VCO 52 by this output signal of the combining circuit 62, a clock signal synchronized with the output signal of the waveform shaping circuit 11 (reproduced signal) is derived from the VCO 52.

Figure 7:
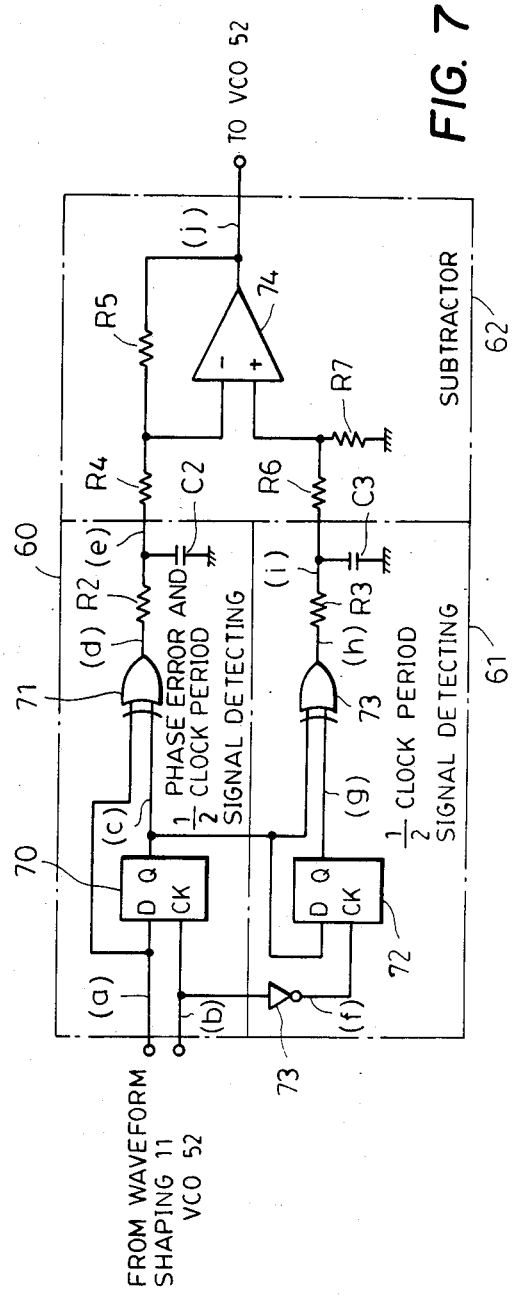
FIG. 7 is a circuit diagram showing a specific example of the circuit of FIG. 6.
Figure 8:
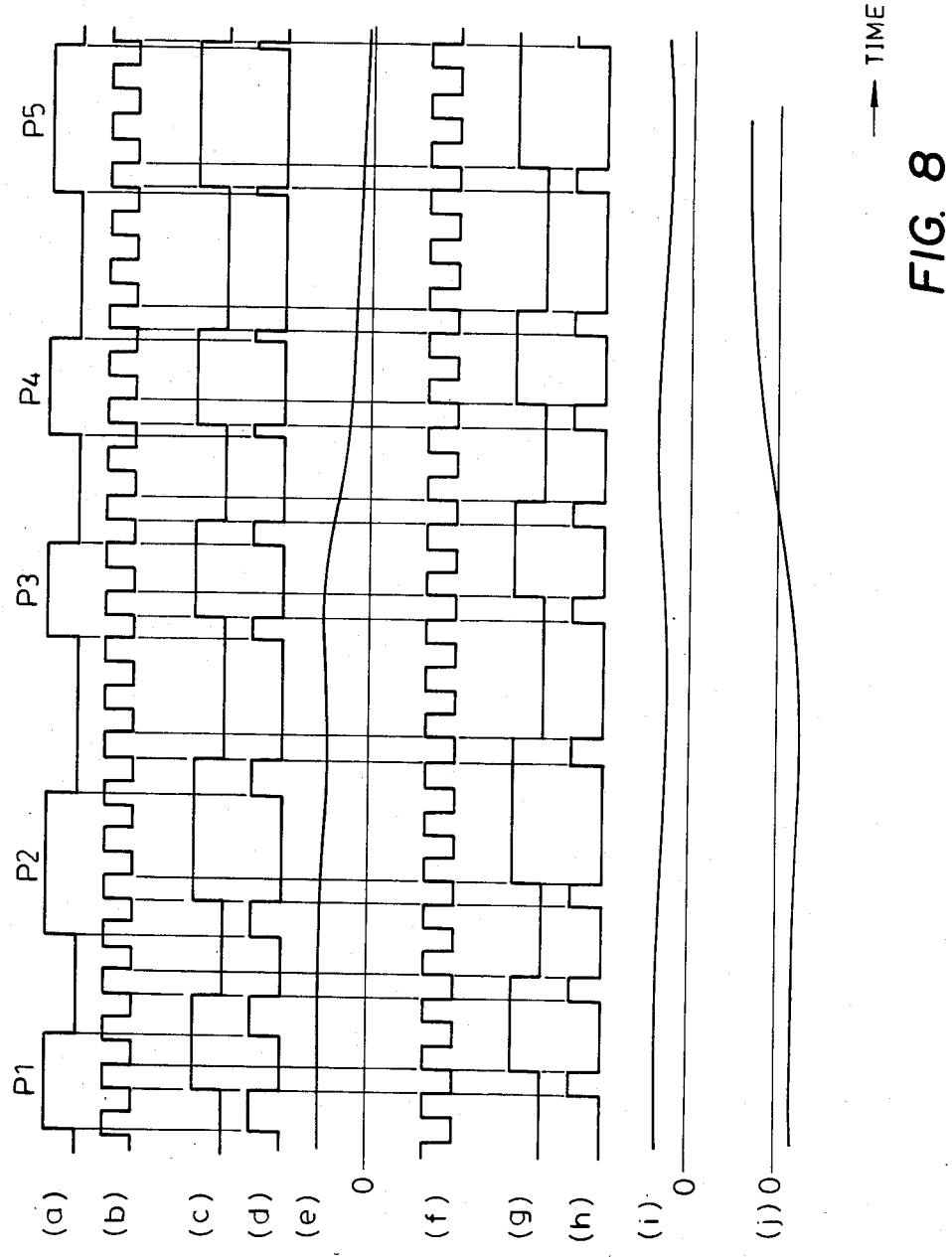
FIG. 8(a) thorugh 8(j) are waveform diagrams showing waveforms appearing in portions designated by (a) through (j) in FIG. 7.

FIG. 7 shows a specific example of the circuit of FIG. 6. In FIG. 7, the phase error and ½ clock period signal detecting circuit 60 is constructed in the same manner as the circuit of FIG. 3. The output signal of the waveform shaping circuit 11 is delayed in a D-flip-flop circuit 70 by the clock signal from the VCO 52. An exclusive OR gate 71 receives the output signal of the waveform shaping circuit 11 and a Q output of the D-flip-flop circuit 70 and provides a phase error detection signal containing the ½ period component of the clock signal. This signal is smoothed by a time constant circuit consisting of a resistor R2 and a capacitor C2 and thereafter is delivered from the circuit 60.

The ½ clock period signal detecting circuit 61 comprises a D-flip-flop circuit 72. This circuit 72 receives the Q output of the flip-flop circuit 70 at its D input and also receives, at its clock input, a signal derived by inverting the clock signal from the VCO 52 by an inverter 73 and produces a signal which is equivalent to the Q output of the flip-flop circuit 70 delayed by ½ period of the clock signal. An exclusive OR gate 73 receives both Q outputs of the D-flip-flop circuits 70 and 72 and provides the ½ clock period signal each time the Q output of the D-flip-flop circuit 70 is inverted. The output signal of the exclusive OR gate 73 is smoothed by a time constant circuit consisting of a resistor R3 and a capacitor C3 and thereafter is delivered from the circuit 61.

The output signals of the circuits 60 and 61 are applied to a subtractor circuit 62 consisting of an operational amplifier 74 and resistors R4, R5, R6 and R7. The ½ clock period signal is cancelled by this subtractor circuit 62 and the signal containing only the phase error information is derived from the circuit 62.

FIGS. 8(a) through 8(j) show waveforms appearing in portions designated by reference characters (a) through (j) in FIG. 7. These diagrams show a control in which phase is advanced from a state P1 in which the phase of the clock signal of (b) is delayed through a state P3 in which the signals of (a) and (b) are synchronized to states P4 and P5 in which the phase of the clock signal of (b) has advanced exceeding the phase of the signal of (a). The phase error signal is shown as a signal of (j) which is a difference obtained by subtracting the signal of (e) from the signal of (i). The phase error signal becomes zero in the vicinity of the state P3 representing the synchronized state. In the state before P3, the polarity of the phase error signal is negative (−) representing the state in which the phase of the clock signal is delayed whereas in the state after P3, the polarity is positive (+) representing the state in which the phase has exceeded. Accordingly, by utilizing this phase error signal for the control of the VCO 52, i.e., increasing the oscillation frequency when the phase error signal is in the negative, maintaining the oscillation frequency when the phase error signal is zero and decreasing the oscillation frequency when the phase error signal is in the positive, the clock signal of (b) can be accurately synchronized with the input signal reproduced from the disc.

In the state in which the signals of (a) and (b) are not synchronized with each other, the phase error signal of (j) changes due not only to the phase error but to the frequency of generation of the signal of (d), i.e., the phase error signal increases if the frequency of generation of the signal of (d) is high whereas it decreases if such frequency is low. In the synchronized state, however, the phase error signal is zero and therefore the phase error signal at this state does not change depending upon the frequency of generation of the signal of (d). Accordingly, no change takes place in the reference voltage in the control. In a case where the phase of the clock signal has exceeded that of the reproduced signal, it is not necessary to perform the phase advancing control from the initial state again as in the prior art but the phases can be synchronized by reversely shifting the phase of the clock signal.

What I claim is:

1. A clock signal reproducing circuit in a player reproducing information of a digital disc comprising:
   an input signal terminal receiving an input signal reproduced from the disc via pickup means;
   clock signal generating circuit means including a voltage controlled oscillator for generating a clock signal having a period of about 1/n (n being an integer) of the input signal reproduced from said pickup means which has been applied to said input signal terminal, said voltage controlled oscillator having a positive first control voltage applied to it corresponding to the actual period;

an output signal terminal from which the clock signal generated by said voltage controlled oscillator is delivered;

first detecting circuit means, receiving the input signal reproduced from said pickup means and the clock signal gneerated by said voltage controlled oscillator, for detecting a phase error between the two signals to deliver out a first detection signal, said first detection signal containing the phase error and a component equal to ½ period of the clock signal generated by siad voltage controlled oscillator;

second detecting circuit means receiving the clock signal generated by said voltage controlled oscillator for generating the component equal to ½ period of the clock signal as a second detection signal each time a first detection signal is generated; and combining circuit means receiving the first and second detection signals for cancelling the component equal to ½ period of the clock signal contained in the first and second detection signals and delivering out only the phase error component contained in the first detection signal as a bipolar second control voltage, wherein the second control voltage is applied to the voltage controlled oscillator in addition to the first control voltage so that the clock signal generated by said clock signal generating circuit means is in phase with the input signal applied to said input signal terminal.

2. A clock signal reproducing circuit as defined in claim 1 wherein said clock signal generating circuit means further comprises a clock detecting circuit for detecting a clock signal from the input signal reproduced from said pickup means and a frequency-voltage converter for converting the clock signal detected by said clock signal detecting circuit into a voltage corresponding to its frequency, wherein the output of the converter is the first control voltage.

3. A clock signal reproducing circuit as defined in claim 1 wherein said first detecting circuit means comprises a first D-flip-flop circuit receiving the input signal reproduced from said pickup means and the clock signal generated by said voltage controlled oscillator, a first exclusive OR gate receiving the input signal reproduced from said pickup means and a Q output of said first D-flip-flop circuit and a time constant circuit coupled to the output of said first exclusive OR gate.

4. A clock signal reproducing circuit as defined in claim 1 wherein said second detecting circuit means comprises an inverter receiving the clock signal generated by said clock signal generating means, a second D-flip-flop circuit receiving an output signal of said inverter and the Q output of said first D-flip-flop circuit, a second exclusive OR gate receiving the Q outputs of said first and second D-flip-flop circuits and a time constant circuit coupled to the output of said second exclusive OR gate.

5. A clock circuit reproducing circuit as defined in claim 1 wherein said combining circuit means is a subtractor circuit.

6. A clock signal reproducing circuit in a player reproducing information of a digital disc comprising:

an input signal terminal receiving an input signal reproduced from the disc via pickup menas;

clock signal generating circuit means for generating a clock signal having a period of about 1/n (n being an integer) of the input signal reproduced from said pickup means which has been applied to said input signal terminal, wherein said clock signal generating circuit means comprises a clock detecting circuit for detecting a clock signal from the input signal reproduced from said pickup means, a frequency-voltage converter for converting the clock signal detected by said clock signal detecting circuit into a voltage corresponding to its frequency and a voltage-controlled oscillator driven by this voltage to provide said clock signal having a period of about 1/n;

an output signal terminal from which the clock signal generated by said clock signal generating circuit means is delivered;

first detecting circuit means, receiving the input signal reproduced from said pickup means and the clock signal gnerated by said clock signal generating circuit means, for detecting a phase error between the two received signals to deliver out the phase error as a first detection signal, said first detection signal containing a component equal to ½ period of the clock signal generated by said clock signal generating circuit means;

second detecting circuit means receiving the clock signal generated by said clock signal generating circuit means for generating a component equal to ½ period of the clock signal as a second detection signal each time a first detection signal is generated;

combining circuit means receiving the first and second detection signals for cancelling the component equal to ½ period of the clock signal contained in the first and second detection signals and delivering out only the phase error component contained in the first detection signal; and a phase locked loop operating in response to the phase error component delivered from said combinating circuit means in such a manner that the clock signal generated by said clock signal generating circuit means is in phase with the input signal applied to said input signal terminal.

7. A clock signal reproducing circuit for a digital disc player, comprising:

clock detecting means for receiving an input signal reproduced from a digital disc and providing a positive first control voltage signal corresponding to the frequency of a disc clock signal contained in the input signal;

a voltage controlled oscillator driven by the first control voltage to provide a system clock signal;

first detector means for receiving the input signal and the system clock signal and providing a first detection signal including a component corresponding to the phase error between the signals and a component equal to one half of the period of the system clock signal;

second detection means for receiving the system clock signal and providing a second detection signal, corresponding to each first detection signal, equal to oen half of the period of the system clock signal; and combining means for combining the first and second detection signals and providing a bipolar second control voltage representative of only the phase error, wherein the second control voltage is applied to the voltage controlled oscillator to increase or decrease the frequency thereof to eliminate said phase error.

* * * * *